United States Patent [19]
Schiavone

[11] 3,961,596
[45] June 8, 1976

[54] BICYCLE DIRECTIONAL SIGNAL

[76] Inventor: Louise Schiavone, 476 Richmond Terrace, Apt. 5A, Staten Island, N.Y. 10301

[22] Filed: Dec. 9, 1974

[21] Appl. No.: 530,802

[52] U.S. Cl. .................................. 116/53; 116/52
[51] Int. Cl.² ........................................ B60Q 1/36
[58] Field of Search ............... 116/52, 51, 53, 54; 24/81 BA, 3 A

[56] References Cited
UNITED STATES PATENTS

| | | | |
|---|---|---|---|
| 1,314,088 | 8/1919 | Matthew | 116/54 |
| 1,413,530 | 4/1922 | Harned | 24/81 BA |
| 3,703,152 | 11/1972 | Morton | 116/28 R |

FOREIGN PATENTS OR APPLICATIONS

| | | | |
|---|---|---|---|
| 42,983 | 9/1930 | Denmark | 116/53 |
| 641,515 | 4/1928 | France | 116/51 |
| 1,034,510 | 7/1953 | France | 116/52 |
| 269,154 | 11/1929 | Italy | 116/52 |

Primary Examiner—S. Clement Swisher
Assistant Examiner—Denis E. Corr
Attorney, Agent, or Firm—Richard L. Miller

[57] ABSTRACT

A directional signal attachable to each arm of a bicycle handle bar so to indicate a signal for intending to turn either in a right or left direction; the device consisting of an arrow shaped lever that is pivotable between a vertical non-signalling position and a horizontal signalling position.

1 Claim, 4 Drawing Figures

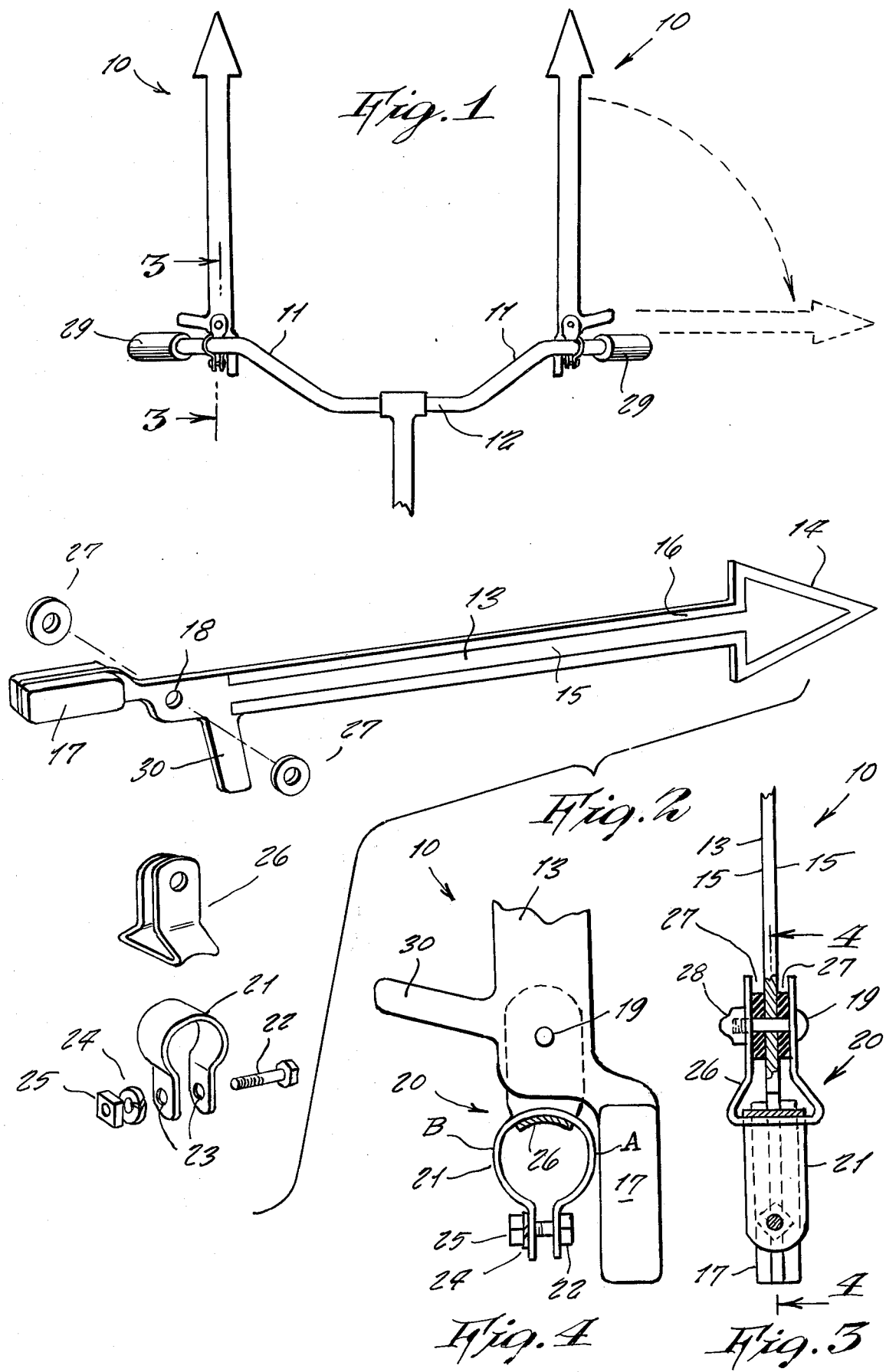

BICYCLE DIRECTIONAL SIGNAL

This invention relates generally to hand operated directional signal devices for vehicles.

A principle object of the present invention is to provide a directional signal that is designed specially for a bicycle, which can be quickly and easily attached thereto, and which can be readily operated by a simple movement of a finger while a hand holds on the handle bar.

Another object is to provide a bicycle directional signal that can be easily seen by other vehicle, but which does not protrude dangerously into the right-of-way of adjacent vehicles.

Still another object is to provide a bicycle directional signal which requires no batteries, but which can be seen in the darkness by approaching vehicles.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

FIG. 1 is a front view of a bicycle showing the invention mounted thereupon.

FIG. 2 is a exploded view of the invention components.

FIG. 3 is a cross section on line 3—3 of FIG. 1.

FIG. 4 is a cross section on line 4—4 of FIG. 3.

Referring now to the drawing in detail, the reference numeral 10 represents a bicycle directional signal according to the present invention which is attachable to each arm 11 of a bicycle handle bar 12 where each can be operated by a bicyclist to signal other vehicle drivers when intending to make either a left or right turn.

Each directional signal 10 includes an arrow-shaped lever 13 having an arrow-head shape 14 at one end. The lever is made of a flat material and on opposite sides 15 thereof a luminescent color 16 outlines the peripheral area so to be clearly visible when the headlights of a vehicle shines thereupon.

At an opposite end of the lever a counterweight 17 is secured thereto, and the lever has a transverse opening 18 along a longitudinally intermediate portion thereof which is located relatively close to the counterweight; the opening receiving a bolt 19 of a stationary base 20 about which the lever is pivotable.

The base includes a U-shaped clip 21 that fits around the arm of the handlebar and which is clamped securely thereto by a bolt 22 extending through clip openings 23 and fitted with lock-washer 24 and nut 25. The base also includes a second clip 26 that fits transversely on the clip 21 and which has openings 22 that receive the bolt 19. The bolt 19 is also fitted with a pair of rubber friction washers 27 so to hold the lever in either a vertical or horizontal position. A castellated cap nut 28 is fitted on the end of bolt 19.

In order that the lever may be easily flipped between a vertical and horizontal position without a bicyclist taking his hand off the grip 29 on the handle bar arms, the lever includes a sideward extension 30 located near the pivot opening 18 in order to be in the vicinity of the bicyclist's hand when on the grip, and he need only to lift a single finger so to push the extension and thus pivot the lever.

As shown in FIG. 4, the end of the lever that carries the counterweight is offset to one side so to fit alongside the bicycle handle bar arm when the lever is in a vertical position.

A review of FIG. 2 will readily indicate accordingly, that the counterweight also serves as a stop for the lever when flipped vertically by abutting against one side A of clip 21. When the lever is flipped down into horizontal position, the extension 30 then serves also as a stop by abutting against a side B of clip 21.

When the levers point up, other vehicles are notified that the bicycle is planning to travel straight ahead. When a lever is flipped down as shown in the example illustrated by dotted lines in FIG. 1, the traffic is advised that the bicycle intends to make a turn into the direction indicated by the arrowhead of the lever.

While certain novel features of this invention have been shown and described and are pointed out in the annexed claims, it will be understood that various omissions, substitutions and changes in the forms and details of the device illustrated and in its operation can be made by those skilled in the art without departing from the spirit of the invention.

What is claimed is:

1. In a bicycle directional signal, the combination of a flat lever and base, said base having means for securement upon an arm of a bicycle handle bar, and means being provided for pivoting said lever between a horizontal and vertical position; said lever being of arrow-shape having an arrow-head shaped on one end, an opposite end having a counterweight secured thereto, a pivot opening transversely through said lever near said counterweight, said opening receiving a pivot bolt of said base and about which said lever pivots; said base being comprised of a pair of generally U-shaped clips hooked together, a first of said clips supporting a second of said clips which carries said pivot bolt; said pivot bolt extending through an opening in each opposite end leg formed on said second clip, and said bolt also extending through openings formed in a pair of rubber friction washers one of which is positioned on each side of said lever, said bolt being fitted with a nut for adjusting a friction grasp of said lever by said washers, and opposite end legs formed on said first clip, each having an opening aligned together for receiving a mounting bolt after the said first clip is fitted around said bicycle handle bar arm, wherein said lever includes a sideward extension located between said arrowhead shaped end and said lever opening, said sideward extension being relatively close to said lever opening, said sideward extension and said counterweight each serving as a stop by abutting against said bicycle handle bar arm when said lever is pivoted between said horizontal and vertical positions respectively, and opposite sides of said lever having peripheral edges covered by a luminescent paint.

* * * * *